United States Patent [19]

Alexander et al.

[11] Patent Number: 4,550,066

[45] Date of Patent: Oct. 29, 1985

[54] SOLID ELECTROLYTE

[75] Inventors: M. Grayson Alexander, Windsor; Brian Riley, Willimantic, both of Conn.

[73] Assignee: Combustion Engineering, Inc., Windsor, Conn.

[21] Appl. No.: 667,211

[22] Filed: Nov. 1, 1984

[51] Int. Cl.$^4$ .............................................. H01M 6/18
[52] U.S. Cl. .................................... 429/191; 204/421; 252/62.2
[58] Field of Search ................. 429/191, 33, 199, 220; 204/421; 252/62.2

[56]       References Cited
       U.S. PATENT DOCUMENTS 3,963,518  6/1976  Senderoff et al. ................... 429/191
4,060,672  11/1977  Alpen et al. ......................... 429/191

OTHER PUBLICATIONS

"Electrical Conductivity of $Ag_2HgI_4$", T. J. Neubert, et al., J. Am. Chem. Soc., 80, pp. 2619–2623, (Jun. 5, 1958).
"Electrical Conductivity and Equilibrium Diagram Studies in the $AgI-ZnI_2$ System", J. W. Brightwell et al., J. Mater. Sci. Letters 1, (1982), pp. 429–431.
"Electrical Transport Studies of Copper Mercuric Iodide", H. B. Lal et al., phys., stat. sol. (a), 77, pp. 405–412.

*Primary Examiner*—Donald L. Walton
*Attorney, Agent, or Firm*—Brumbaugh, Graves, Donohue & Raymond

[57]         ABSTRACT

A solid electrolyte for power cells, especially power cells having a copper anode and a copper sulfide cathode, comprises a solid solution of from about 70 mole percent to about 90 mole percent of copper iodide and from about 30 mole percent to about 10 mole percent, respectively, of zinc iodide.

4 Claims, No Drawings

SOLID ELECTROLYTE

The present invention relates to a solid electrolyte and more particularly to a solid electrolyte for power cells.

Copper iodide is a good $Cu^+$ ionic conductor (and electronic insulator) above 300° C. However, this compound is a less effective ionic conductor at lower temperatures, such as 200° C.

It is the object of the present invention to increase the ionic conductivity of copper iodide at various temperatures so as to make it useful as a solid electrolyte in power cells, especially power cells having a copper anode and a copper sulfide cathode.

The present invention satisfies this objective by providing a solid electrolyte for power cells comprising a solid solution of from about 70 mole percent to about 90 mole percent of copper iodide (CuI) and from about 30 mole percent to about 10 mole percent, respectively, of zinc iodide ($ZnI_2$). In a preferred embodiment of the invention the solid electrolyte comprises a solid solution of about 70 percent of copper iodide and about 30 mole percent of zinc iodide. In an especially preferred embodiment of the invention, the solid electrolyte comprises a solid solution of about 80 mole percent of copper iodide and about 20 mole percent of zinc iodide.

The solid electrolyte of the invention was synthesized by the following procedure.

Various predried (at 120° C. in argon or vacuum) and premixed (½ hour in Vibro mill) mole ratio quantities of CuI and $ZnI_2$ powders, corresponding to the desired composition, were placed in a 1 inch diameter silica test tube (for high $ZnI_2$ compositions a Pyrex tube was used). The tube was sealed using an oxygen-propane flame. The encapsulated mixture was loaded into an autoclave, the autoclave sealed and the system placed inside a tube furnace. The furnace was heated to 550° C., i.e., to above the melting point of the mixture, over a period of 2 to 3 hours and at frequent intervals the inside of the autoclave was pressurized with argon or nitrogen gas up to approximately 50-60 psi to prevent the silica capsule from exploding due to the iodine vapor pressure. The molten mixture was kept at constant temperature for 1 to 2 hours and cooled to room temperature over 5 hours.

The silica capsule containing the now solidified melt was then removed from the autoclave and transferred to a dry argon atmosphere glovebox. The silica capsule was opened and the solidified melt removed. All the iodide mixtures prepared were hygroscopic and were protected from the atomosphere at all times.

The solidified iodide melt was crushed to pass through a 20-mesh sieve, then further ground prior to pressing into 2.5 cm diameter, 1 to 3 mm thick discs for conductivity measurements. (The pressing was cold pressing at 8 tons per square inch for 1 hour or hot pressing at 200° C. at 5 tons per square inch for ½ hour.)

Total (electronic+ionic) conductivities ($\sigma$) were measured by a standard AC method (J. E. Bauerle, J. Phys. Chem. Solids 30, 2657 (1969) ). Electronic conductivities were measured separately by the Wagner polarization method (C. Wagner, Z. Elektrochem. 60, 4 (1956) ). Ionic conductivity set forth in Table I below was determined by subtracting the electronic conductivity from the total conductivity.

TABLE I

| Composition - mole % | | Ionic Conductivity $(ohm-cm)^{-1}$ | |
| --- | --- | --- | --- |
| CuI | $ZnI_2$ | at 200° C. | at 300° C. |
| 100 | — | $5.25 \times 10^{-5}$ | $1.43 \times 10^{-3}$ |
| 90 | 10 | $4.90 \times 10^{-5}$ | $1.54 \times 10^{-3}$ |
| 80 | 20 | $3.55 \times 10^{-4}$ | $1.11 \times 10^{-2}$ |
| 70 | 30 | $1.55 \times 10^{-4}$ | $4.37 \times 10^{-3}$ |
| 67 | 33 | $3.39 \times 10^{-6}$ | $3.92 \times 10^{-4}$ |
| 60 | 40 | $2.40 \times 10^{-5}$ | $1.33 \times 10^{-3}$ |
| 50 | 50 | $1.56 \times 10^{-5}$ | $8.06 \times 10^{-4}$ |
| 40 | 60 | $1.82 \times 10^{-5}$ | $6.10 \times 10^{-4}$ |
| 30 | 70 | $4.01 \times 10^{-7}$ | $3.63 \times 10^{-4}$ |

The data in Table I above show that the $CuI/ZnI_2$ solid solution compositions of 70-90 mole percent CuI have unexpectedly high ionic conductivities which are usually greater than that of pure (100%) CuI at temperatures of 200° C. and higher. This is particularly true of the preferred 70 mole percent CuI solid solution composition and is more particularly true of the especially preferred 80 mole percent CuI solid solution composition. These findings are remarkable in view of the fact that $ZnI_2$ is not an ionic conductor, i.e., its ionic conductivity at 200° C. and at 300° C. is zero.

What is claimed is:

1. A solid electrolyte for power cells comprising a solid solution of from about 70 mole percent to about 90 mole percent of copper iodide and from about 30 mole percent to about 10 mole percent, respectively, of zinc iodide.

2. A solid electrolyte according to claim 1 comprising a solid solution of about 90 mole percent of copper iodide and about 10 mole percent of zinc iodide.

3. A solid electrolyte according to claim 1 comprising a solid solution of about 80 mole percent of copper iodide and about 20 mole percent of zinc iodide.

4. A solid electrolyte according to claim 1 comprising a solid solution of about 70 mole percent of copper iodide and about 30 mole percent of zinc iodide.

* * * * *

UNITED STATES PATENT AND TRADEMARK OFFICE
CERTIFICATE OF CORRECTION

PATENT NO. : 4,550,066

DATED : October 29, 1985

INVENTOR(S) : M. Grayson Alexander et al

It is certified that error appears in the above-identified patent and that said Letters Patent is hereby corrected as shown below:

First page, second column, last line under "OTHER PUBLICATIONS", insert -- (1983) --. Column 1, line 24, after "70" insert -- mole --.

Signed and Sealed this

Fourth Day of March 1986

[SEAL]

Attest:

DONALD J. QUIGG

Attesting Officer

Commissioner of Patents and Trademarks